United States Patent [19]

Meehan

[11] Patent Number: 5,347,536
[45] Date of Patent: Sep. 13, 1994

[54] MULTIPATH NOISE REDUCTION FOR SPREAD SPECTRUM SIGNALS

[75] Inventor: Thomas K. Meehan, Glendale, Calif.

[73] Assignee: The United States of America as represented by the Administrator of the National Aeronautics and Space Administration, Washington, D.C.

[21] Appl. No.: 39,783

[22] Filed: Mar. 17, 1993

[51] Int. Cl.$^5$ ............................................. H04L 27/30
[52] U.S. Cl. ........................................ 375/1; 375/10; 375/34; 375/58; 375/99; 380/2; 380/34; 455/50.1; 455/63; 455/65; 455/67.1; 455/67.3; 455/226.1; 455/296
[58] Field of Search ................. 455/50.1, 63, 65, 67.1, 455/67.3, 226.1, 296; 375/10, 34, 51, 57, 58, 99

[56] References Cited

U.S. PATENT DOCUMENTS

| | | | |
|---|---|---|---|
| 2,982,853 | 5/1961 | Price et al. | 375/1 X |
| 3,351,859 | 11/1967 | Groth, Jr. et al. | 375/1 |
| 4,151,524 | 4/1979 | Caputi, Jr. | 375/58 X |
| 4,266,296 | 5/1981 | Ishigaki | 455/296 X |
| 4,457,007 | 6/1984 | Gutleber | 455/65 X |
| 4,669,091 | 5/1987 | Nossen | 375/51 X |
| 4,672,638 | 6/1987 | Taguchi et al. | 375/99 |
| 5,224,122 | 6/1993 | Bruckert | 375/1 |

*Primary Examiner*—Bernarr E. Gregory
*Attorney, Agent, or Firm*—John H. Kusmiss; Thomas H. Jones; Guy M. Miller

[57] ABSTRACT

The invention includes the concepts of early-prompt delay tracking, multipath correction of early-prompt delay tracking from correlation shape and carrier phase multipath correction. In early-prompt delay tracking, since multipath is always delayed with respect to the direct signals, the system derives phase and pseudo-range observables from earlier correlation lags. In multipath correction of early-prompt delay tracking from correlation shape, the system looks for relative variations of amplitude across the code correlation function that do not match the predicted multipath-free code cross-correlation shape. The system then uses deviations from the multipath-free shape to infer the magnitude of multipath, and to generate corrections pseudo-range observables. In carrier phase multipath correction, the system looks for variations of phase among plural early and prompt lags. The system uses the measured phase variations, along with the general principle that the multipath errors are larger for later lags, to infer the presence of multipath, and to generate corrections for carrier-phase observables.

66 Claims, 15 Drawing Sheets

MULTIPATH NOISE REDUCTION FOR SPREAD SPECTRUM SIGNALS

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention is related to spread spectrum signal acquisition and in particular to spread spectrum signal acquisition in the presence of multipath fading and noise, and to improved techniques for reducing such multipath noise.

2. Background Art

References

The invention and its background will be described with reference to the following publications:

1. Van Dierendonck, A., Fenton, P. and Ford, T., 1992. "Theory and Performance of Narrow Correlator Spacing in a GPS Receiver." Presented at the Institute of Navigation National Technical Meeting, San Diego, Calif.
2. Meehan, T., et al, 1992, "The TurboRogue GPS Receiver", Presented at the Sixth International Symposium on Satellite Positioning.
3. Buennagel, L., et al, 1984, "SERIES Project Final Report", Jet Propulsion Laboratory Technical Publication 84-16.

Discussion

Multipath errors originate with contamination of GPS signals by delayed versions of these signals. For some applications using either pseudorange or carrier phase observables, multipath is the dominant error source. The most direct approach for reducing this error is to select an antenna site distant from reflecting objects, and to design antenna/backplane combinations to further isolate the antenna from its surroundings. In some cases, however, antennas must be located in relatively poor sites, and other techniques for multipath reduction are required. This specification will describe on-receiver processing which reduces carrier-phase and pseudorange multipath. Processing techniques for detecting and reducing the effects of these errors will be discussed. Demonstrated multipath-error reduction is shown using test data and simulations.

GPS receivers commonly use broad antenna gain patterns so that satellites can be tracked to low elevation angles. This makes the GPS system susceptible to reflections of the satellite signals coming from objects around the antenna. Unfortunately, location of antennas in sites that are free from reflecting objects is frequently not possible. One approach for the reduction of multipath has been to design antennas for steep gain drop off at low elevation angles, while preserving circular polarization characteristics. In order to achieve rapid gain drop off, antenna dimensions must be increased, which is sometimes impractical. Also, elimination of low-elevation data makes it more difficult to estimate tropospheric delays, a requirement for applications of highest-accuracy GPS.

In the following sections, various techniques for the reduction of multipath error are briefly described. As part of research in progress at the Jet Propulsion Laboratory (JPL), some of these techniques are being tested with the new TurboRogue GPS receiver [Meehan et al, 1992]. Results of simulations and tests are given.

Some Techniques for Reduction of Multipath Error

Several options for multipath error reduction, in addition to the use of clear sites and antenna designed for low gains at low elevation angles, are given below. A simple depiction of specular multipath characteristics for a GPS antenna above a horizontal reflecting surface is illustrated in FIG. 1.

1. One much-used technique is the use of temporal averaging, which does a good job of removing short period (<few minutes) carrier-phase multipath signatures from distant (>few meters) objects. This does not work well for low frequency multipath from nearby objects, however, and is of limited effectiveness for pseudorange multipath errors, which are not zero mean.
2. In order to calibrate multipath at an antenna site, temporarily install a second GPS antenna at a nearby low-multipath location. Use residuals from the a priori baseline, after clock estimation, to determine both carrier and pseudorange multipath for the single-differenced (one satellite, two receivers) observable. If multipath from the calibration antenna is not negligible, it can be estimated by moving it one half GPS wavelength (for L1 and L2) from reflecting surfaces to separate its multipath contribution from the antenna under test. This can be used to calibrate the bias and variations caused by multipath in phase and pseudorange observables.
3. Variations in pseudorange multipath can be calibrated by using a linear combination of carrier phase observables to remove geometric, media, and clock effects from the pseudorange observable, leaving pseudorange multipath plus system noise. This approach does not determine the overall bias due to multipath, which is usually the most damaging part of the pseudorange multipath error.
4. The next procedure requires the use of an antenna with a well-calibrated gain pattern. Rotate the antenna about its phase center. As relative gain towards the satellite and multipath sources changes, there will be a variation in the observables, which can be used to estimate the amount of multipath from each source, which can be estimated and removed analytically.
5. Use the P-code multipath variations determined from 3. to predict carrier multipath. This approach requires a knowledge of the mapping from multipath amplitude and delay to the receiver observables, that is, the pseudoranges and carrier phases. This relationship has been described for the TurboRogue receiver in previous work. In order for this approach to work well, the geometry of surrounding reflectors should be simple and well known. This would be the situation on most aircraft or satellite applications.
6. In the case of simple, well known geometries, the multipath effects could also be modeled directly, using electromagnetic scattering theory. It is believed that this approach would require calibrations from observed pseudorange multipath to provide reliable calibrations.

7. Derive the phase and pseudorange observables simultaneously using different signal processing, for example, code and delay-and-multiply processing [Buennagel et al, 1984] Because multipath affects the two processing techniques with different amplitudes, a multipath correction signal can be formed from the difference in the code vs. codeless observables.

8. As described in References 1 and 2 above, for certain ranges of multipath delay, the amount of pseudorange multipath error depends on the receiver lag spacing. In particular, the use of narrower lag spacing will give reduced multipath. This technique is particularly effective for the C/A code, as pointed out by Van Dierendonck, et al.

SUMMARY OF THE DISCLOSURE

There are three basic concepts in the invention, namely early-prompt delay tracking, multipath correction of early-prompt delay tracking from correlation shape and carrier phase multipath correction.

In early-prompt delay tracking, since multipath is always delayed with respect to the direct signals, the system derives phase and pseudorange observables from earlier correlation lags.

In multipath correction of early-prompt delay tracking from correlation shape, the system looks for relative variations of amplitude across the code correlation function that do not match the predicted multipath-free code cross-correlation shape. The system then uses deviations from the multipath-free shape to infer the magnitude of multipath, and to generate corrections for pseudorange observables.

In carrier phase multipath correction, the system looks for variations of phase among early, prompt, and late lags. The system uses the measured phase variations, along with the general principle that the multipath errors are larger for later lags, to infer the presence of multipath, and to generate corrections for carrier-phase observables.

Early-Prompt Delay Tracking

In a receiver for receiving an incoming signal consisting of a carrier tone modulated by a spread spectrum code sequence, the receiver being of the type which generates a local model of the carrier tone and a local model of the code sequence, the system maintains phase lock with the carrier tone of the incoming signal in the presence of multipath distortion in the incoming signal by generating early and prompt versions of the model code sequence delayed by respective multiples of a predetermined lag, generating an early and prompt product signal by a multiplication of the incoming signal by the model carrier tone and a respective one of the early and prompt model code versions. A correlator computes respective early and prompt cross-correlation functions from respective ones of the early and prompt product signals. A phase lock loop controls the phase of the model carrier tone relative to the carrier of the incoming signal in response to the prompt cross-correlation function. A delay error tracker computes a delay tracking error corresponding to a deviation from a predetermined relationship between the early and prompt cross-correlation functions, and then changes the phase of the model code sequence in accordance with the delay tracking error in such a manner as to reduce the deviation.

The correlator computes the cross-correlation functions by accumulating respective product signals over a sampling interval of length T and computes successive cross-correlation functions in successive cycles of period T. The predetermined lag is the period T and the multiples of the lag are one and two for the prompt and early model code sequence versions respectively.

The predetermined relationship is a predetermined ratio between the quadrature components of the prompt and early cross-correlation functions prevailing in the absence of multipath distortion in the incoming signal. The phase lock loop responds to the in-phase and quadrature components of the prompt cross-correlation function. The delay error tracker measures an actual ratio between the quadrature components of the prompt and early cross-correlation functions and producing an error signal which is a function is the deviation of the actual ratio from the predetermined ratio. If the incoming signal is from a global positioning satellite, the device transmits the delay tracking error as a correction to an estimated pseudo-range value computed during a previous cycle.

Multipath Correction of Early-Prompt Tracking from Correlation Shape

In another embodiment of the invention, an early cross-correlation function is also produced corresponding to an early lag time. In this embodiment, a shape corrector computes a correction to the delay tracking error corresponding to a deviation from a second predetermined relationship between the late and prompt cross-correlation functions, the correction being de-weighted relative to the delay tracking error, and changes the phase of the model code sequence so as to minimize the delay tracking error and the de-weighted correction. In this case the multiples of the lag are zero, one and two for the late, prompt and early model code sequence versions, respectively. The second predetermined relationship is a predetermined ratio between the quadrature components of the prompt and late cross-correlation functions prevailing in the absence of multipath distortion in the incoming signal. The correction obtained from the shape corrector is de-weighted relative to the delay tracking error.

Carrier Phase Multipath Correction

In a third embodiment of the invention, carrier phase lock is maintained by generating prompt and plural early versions of the model code sequence delayed by respective multiples of a predetermined lag, generating prompt and plural early product signals by multiplying the incoming signal by the model carrier tone and by a respective one of the prompt and plural early versions of the model code. A correlator computes respective prompt and plural early cross-correlation functions from respective ones of the prompt and plural early product signals, and a carrier phase corrector computes a carrier phase error corresponding to a deviation of the prompt cross-correlation function from a behavior predictable from the plural early cross-correlation functions. A phase lock loop controls the phase of the model carrier tone relative to the carrier of the incoming signal in response to the carrier phase error.

The correlator computes the cross-correlation functions by accumulating respective product signals over a sampling interval of length T and computes successive correlation functions in successive cycles of period T. In one simplified implementation of the invention, the predetermined lag is the period T, there are two early versions of the model code sequence and the multiples of the lag are one, two and three for the prompt and plural early model code sequence versions, respectively.

The predictable behavior is defined in the absence of multi-path distortion in the incoming signal. Preferably, the predictable behavior is defined relative to a curve obtained by associating phase angles of the plural early cross-correlation functions with lag times of the respective early cross-correlation functions, the predictable behavior being that the curve intersects the phase angle of the prompt cross-correlation function at the lag time of the prompt cross-correlation function.

The carrier phase corrector employs curve fitting to compute a lag time at which the curve meets the amplitude of the phase of the prompt cross-correlation function, and establishes therefrom the carrier phase error. The phase angle of each cross-correlation function is computed as the arc-tangent of the ratio of in-phase and quadrature components thereof.

In this embodiment, the phase of the model code sequence is preferably controlled by the tracking processor of either the early-prompt tracking (the first embodiment summarized above) or by the tracking processor of the early-early prompt tracking (the second embodiment summarized above).

DETAILED DESCRIPTION OF THE PREFERRED EMBODIMENT

Introduction: TurboRogue Baseband Processing

Figure 1:
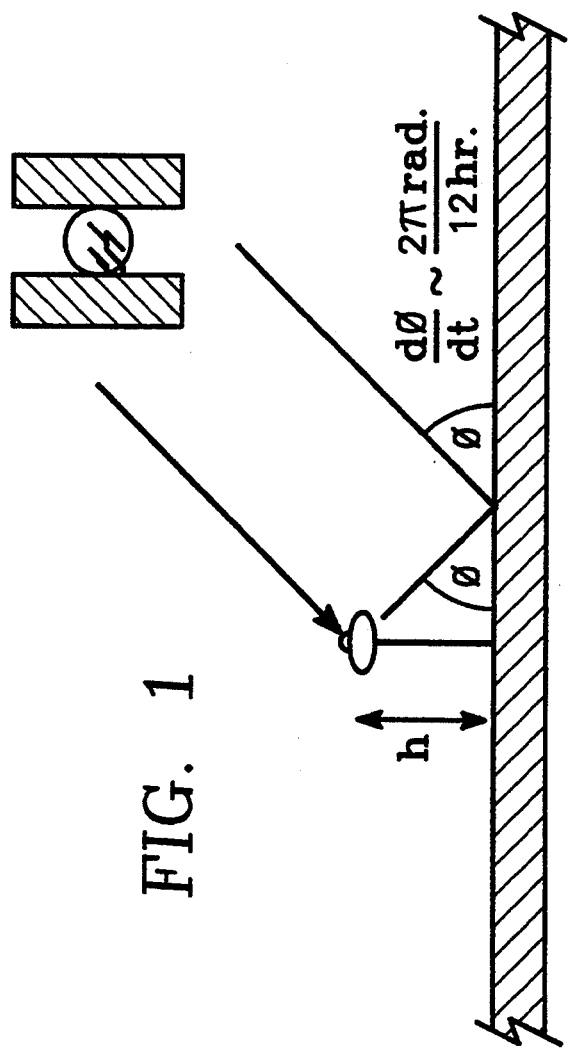
FIG. 1 is a diagram illustrating the problem of multi-path signal distortion in satellite signal reception.
Figure 2:
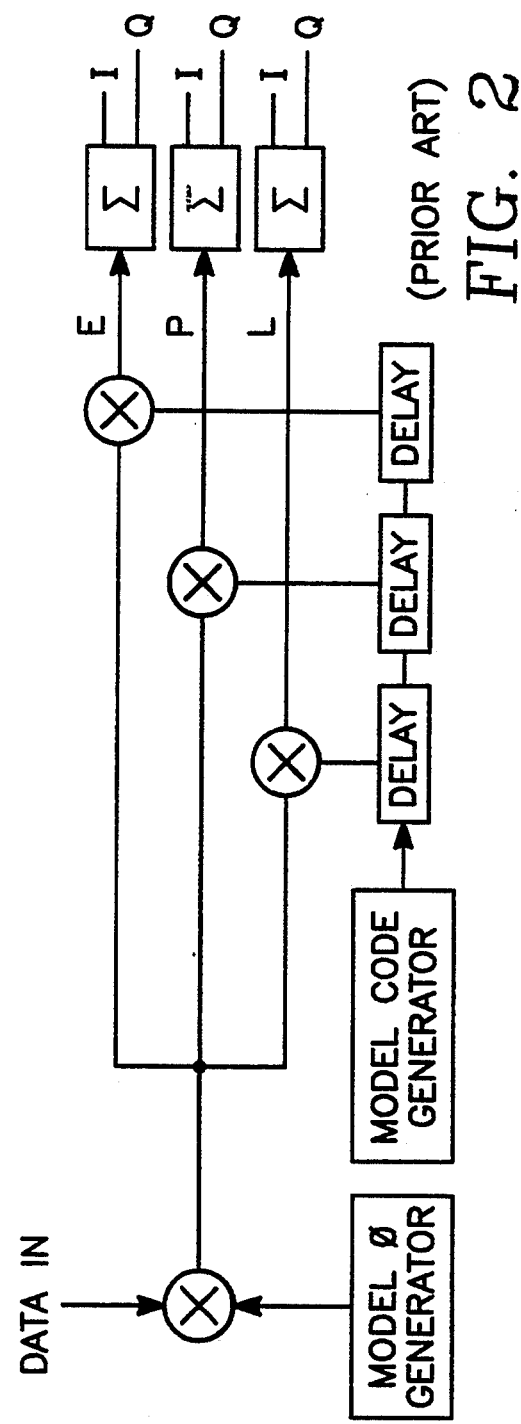
FIG. 2 is a simplified block diagram of a global positioning satellite signal receiver of the prior art.

The TurboRogue GPS receiver digitally processes all baseband tracking data. The receiver can simultaneously measure the L1-C/A, L1-P and L2-P phases and pseudoranges of eight GPS satellites. All tracking loops are software controlled and "high-speed" (20 MHz) operations are performed in a VLSI (Very Large Scale Integration) chip designed at Jet Propulsion Laboratory in Pasadena, Calif. The GPS signal processing carried out inside the VLSI chip is illustrated in FIG. 2. Several features of TurboRogue processing are significant with regard to the topic of on-receiver multipath reduction. They are:

1. Independent correlator-accumulators for early, late and prompt (I and Q) correlation sums. Delay processing of correlation sums is under full software control, allowing a wide variety of techniques to be employed.
2. Complete initialization of carrier and code parameters (phase and rate) can be performed by the software at the nominal phase feedback rate (50 Hz). This feature is especially useful for accurately "mapping" the receiver cross-correlation function after satellite and receiver filtering has been applied by sweeping the model delay in very small ($<<1$ chip) increments. This allows more accurate simulation of multipath effects and provides an accurate correlation shape for multipath correction.
3. All data (C/A, P1 and P2) are processed at the 20 Mhz rate. The C/A correlators are set for 500 ns (2 MHz) delay spacing for signal acquisition. Following acquisition, the software adjusts the C/A correlator spacing to 50 ns (20 MHz).

Narrow Lag Spacing

Figure 3:
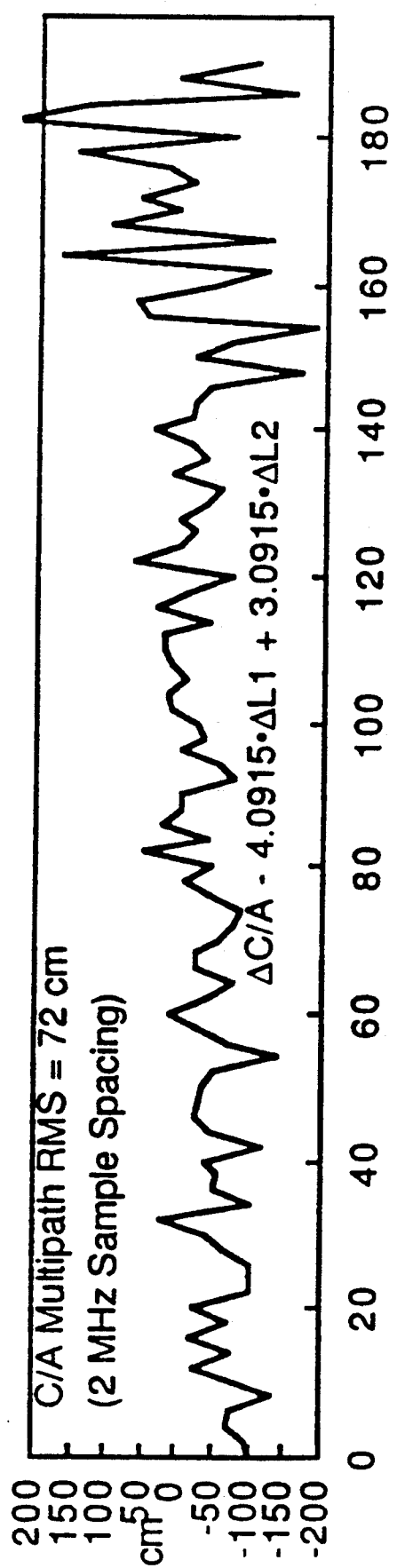
FIGS. 3 and 4 a graphs of multipath lengths measured over time for long and short correlator lag lengths, respectively.

For this test, a TurboRogue was configured to track the same satellite on two channels. Channel 1 of TurboRogue receiver was set to maintain 500 ns delay (lag) spacing for the C/A delay measurements. Meanwhile, channel 2 was allowed to track with the default 50 ns lag spacing. Both channels also tracked the P-code signal. Pseudorange multipath can easily be observed in the data by differencing the pseudorange measurement with a linear combination of L1 and L2 phase measurements. Because the phase measurements are significantly less noisy, the resulting observable is essentially receiver system noise plus multipath. A multipath free plot of this observable should appear as random noise scatter about a horizontal line. For all of these plots the data has been averaged (by the receiver) for 120 seconds, thereby minimizing the effect of receiver system noise. C/A multipath for 500 ns delay spacing (channel 1) is shown in FIG. 3. The data from channel 2 (FIG. 4) shows significantly reduced scatter (33 cm vs 72 cm RMS) which can be explained as follows:

The narrower delay spacing takes advantage of greater noise correlation between correlation lags. This lowers the system noise on the C/A pseudorange measurement [Van Dierendonck et al, 1992]. However, the system noise on TurboRogue C/A pseudorange data (120 sec average) is already insignificant with respect to multipath. Narrower delay spacing also reduces the effects of multipath on the delay measurement. The explanation for this is that for multipath delays greater than the lag spacing, the differential multipath effect on the early and late lags is directly proportional to the lag spacing [Van Dierendonck et al, 1992].

Figure 4:
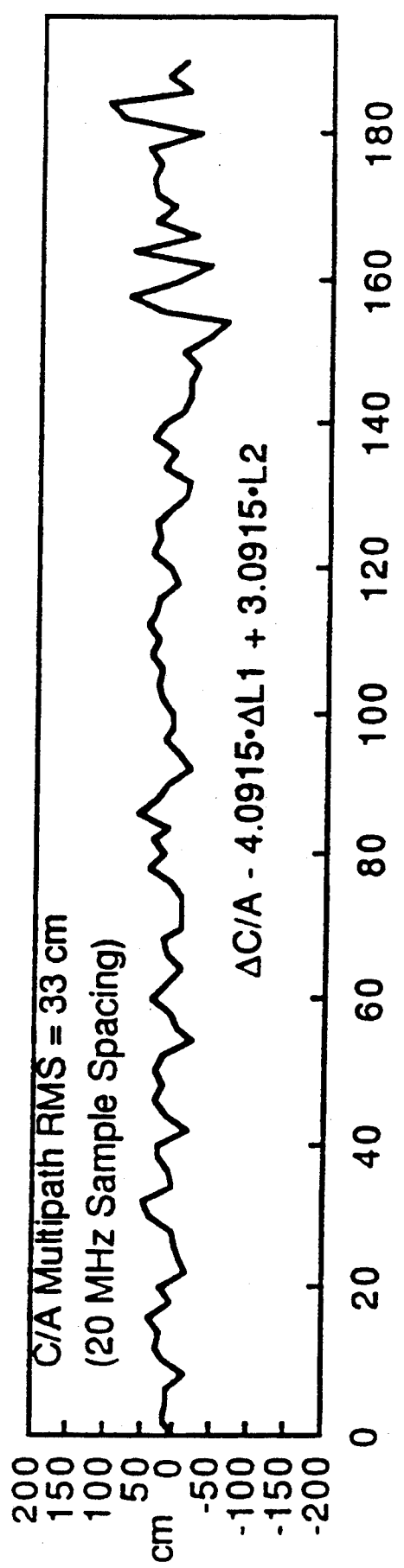
Figure 5:
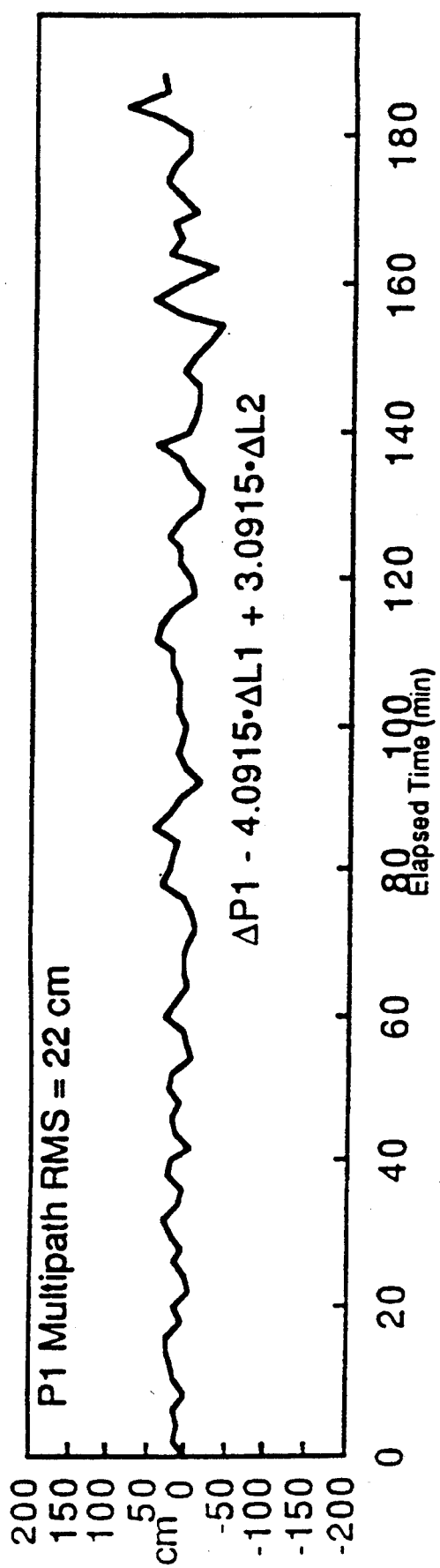
FIG. 5 is a graph of multipath length corresponding to FIG. 4 but for a different spread spectrum code.

The P-code multipath results are shown in FIG. 5 and are similar to FIG. 4 but show less of an effect due to an insensitivity to multipath with delays greater than 1.6 P-code wavelengths.

Early-Prompt Delay Tracking

Figure 6:
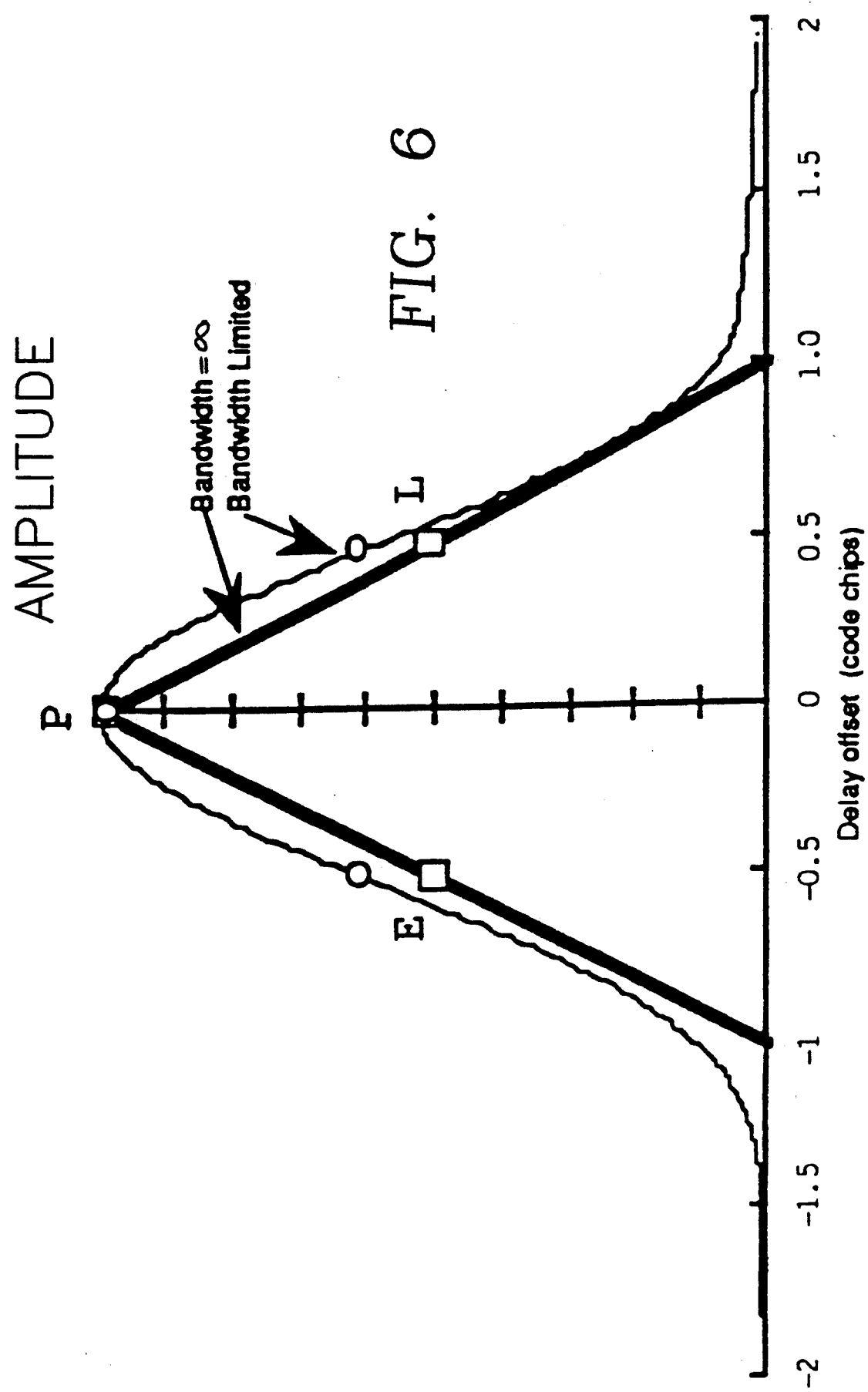
FIG. 6 is a diagram illustrating the fall-off of cross-correlation magnitude with delay offset or lag.

GPS receivers typically employ some form of "null" tracking to maintain delay lock. By this is meant that the delay lock loop adjusts the model delay so that the early and late correlation sums have the same amplitude. Two examples are the so-called "early and late" (EL) tracking and the "prompt and early minus late" (ELP) tracking illustrated in FIG. 6.

Example 1:

$$\text{Delay tracking error} = k \cdot (E-L)/(E+L) \quad (k=0.5 \text{ for } BW=\infty)$$

Example 2:

$$\text{Delay tracking error} = k \cdot (E-L)/P \quad (k=0.5 \text{ for } BW=\infty)$$

The Rogue GPS receiver, an earlier JPL development, employs the ELP technique. However, it is certainly possible to maintain lock without balancing two of the correlation sums. For example, delay error could also be obtained using only E and P correlation sums as follows:

$$\text{Delay tracking error} \sim k \cdot (E - K \cdot P)/P$$

For the infinite bandwidth case, K=0.5 but k is sign dependent. For the 9.6 MHz bandwidth case, K~0.7 and k~1. Pseudorange measurements using this approach incur an increase in system noise error. However, preliminary analysis shows that when bandwidth effects and correlation between lags are considered, the relative increase in system noise over ELP tracking is about 10%. The reduction of multipath greatly outweighs this system noise penalty.

Figure 7:
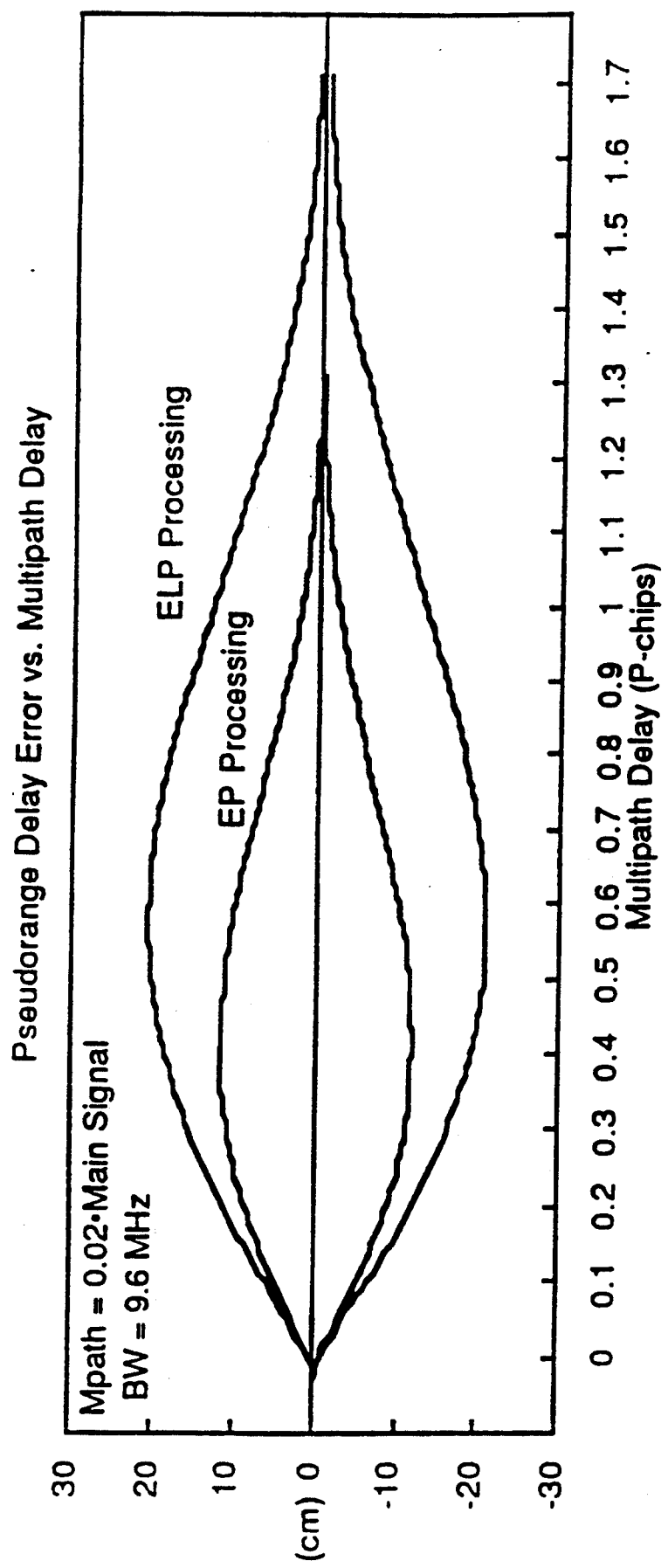
FIG. 7 is a graph comparing pseudo-range error as a function of multipath delay obtained with early-prompt tracking in accordance with the first embodiment of the invention and obtained in the prior art.
Figure 8:
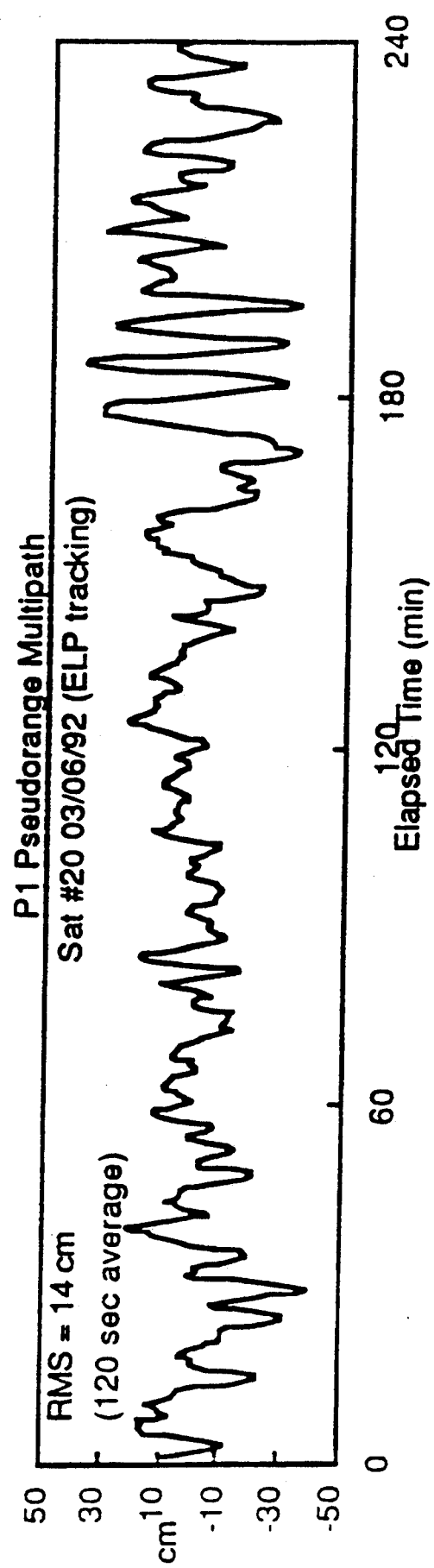
FIGS. 8 and 9 are graphs of multipath length as function of elapsed time obtained in the prior art and in the early-prompt tracking of the invention, respectively.
Figure 9:
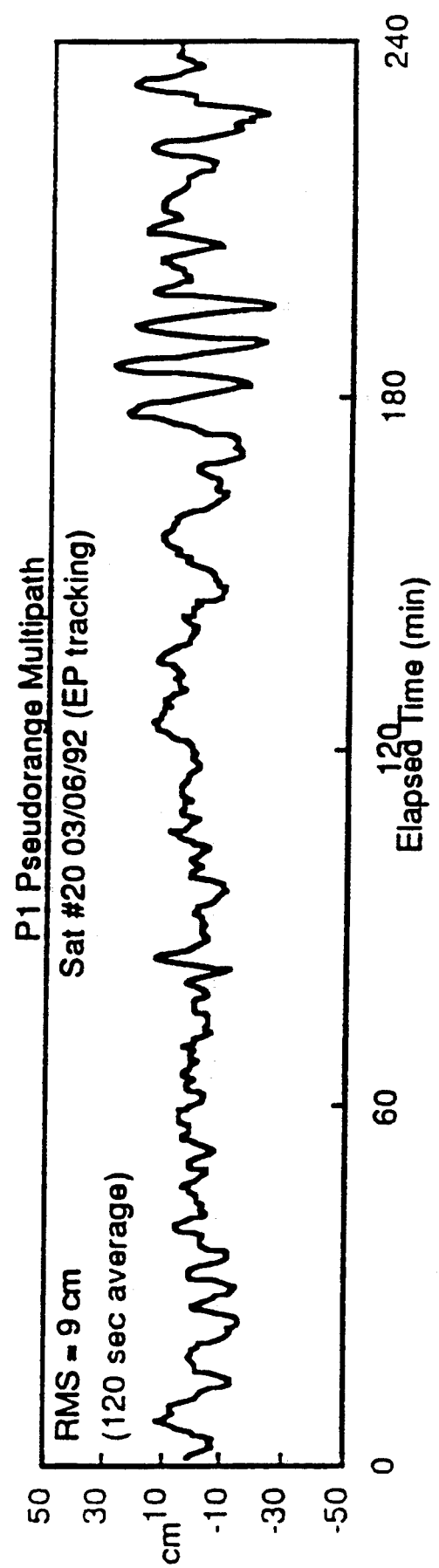

As mentioned earlier, multipath signals are always delayed with respect to the main signal. This explains why early, prompt (EP) tracking is less attacked by and therefore less sensitive to multipath. Simulation data (FIG. 7) indicates that the early-prompt tracking method is significantly less sensitive to multipath with delays greater 0.1 chips (3 m for P-code). Actual P-code tracking data from a rooftop (FIGS. 8 and 9) shows that early-prompt tracking has reduced multipath effects by about a factor of 1.6 (ELP=14 cm; EP=9 cm).

Multipath Correction from Correlation Shape

Figure 10:
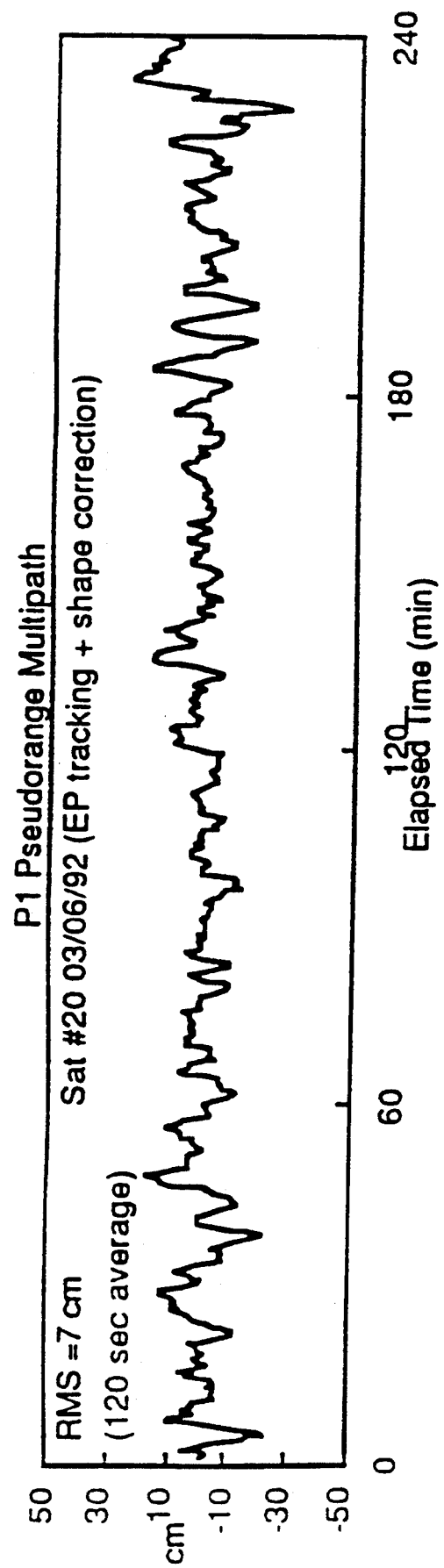
FIG. 10 is a graph of multipath length as a function of elapsed time obtained in a second embodiment of the invention in which the early-prompt tracking of the first embodiment is refined by a correlation shape correction.

Multipath causes pseudorange errors because it distorts the cross-correlation function. This distortion can be detected with a variety of approaches provided some model of the correlation function (including filter effects) is available. The approach presented here employs EP tracking to initially reduce multipath errors. This makes the late correlation sum available for multipath estimation of further pseudorange errors due to multipath. These pseudorange error values are then subtracted from the EP measured pseudorange values and a "before and after" comparison made. As shown in FIG. 10 this method further reduces the RMS pseudorange error.

Carrier Phase Multipath Correction

Figure 11:
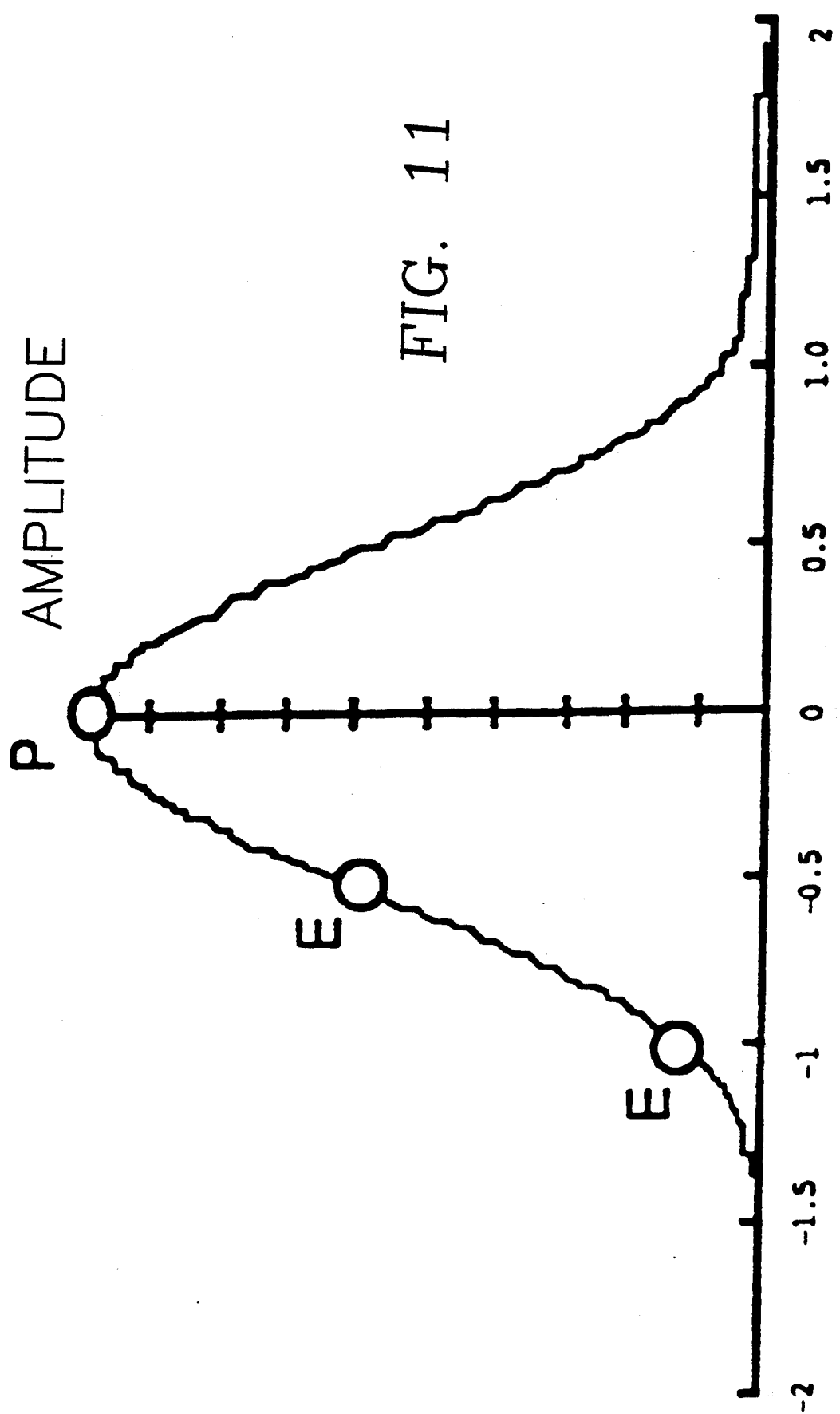
FIG. 11 is a diagram illustrating the placement of two early lags relative to a prompt lag in a third embodiment of the invention employing carrier phase multipath correction.

For geodetic applications, carrier phase is the principal observable. Although relatively small (few mm max.), carrier phase multipath can be the dominant error source of geodetic measurements. One possible method for detecting and correcting carrier phase multipath employs the non-prompt quadrature correlation sums as indicators of the sign and magnitude of carrier phase multipath. The basic scheme, as depicted by FIG. 11, shows the correlation sums (lags) configured in a prompt, early, earliest (PEE) mode.

Figure 12:
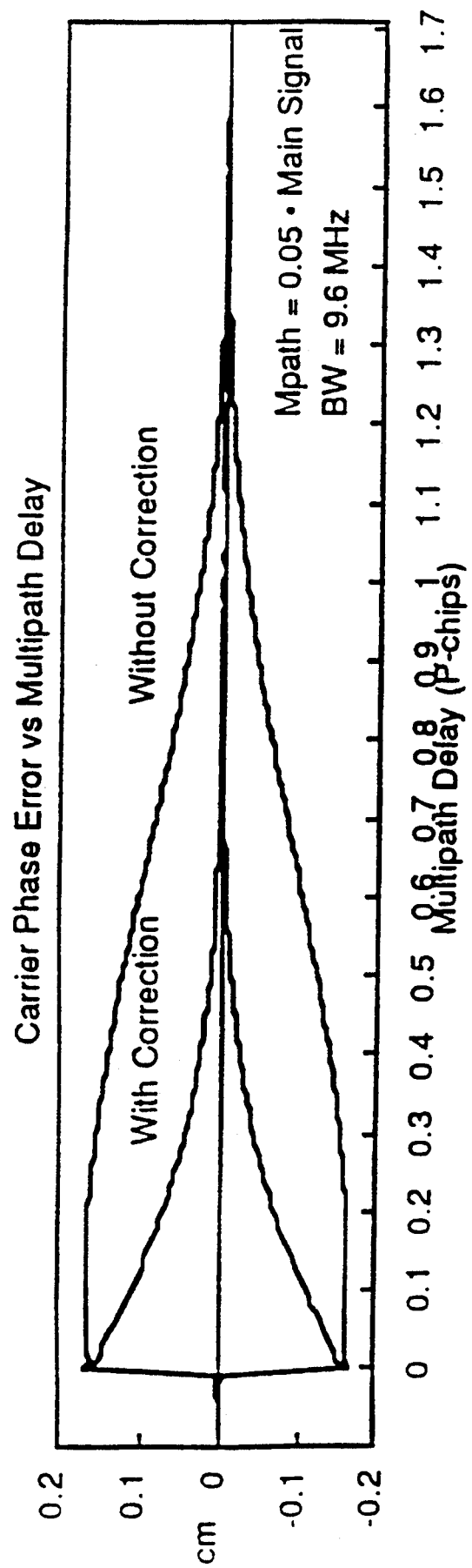
FIG. 12 is a graph comparing carrier phase error as a function of multipath delay measured with and without the carrier phase multipath correction of the third embodiment of the invention.

The carrier loop (a phase-locked loop) uses only the prompt I and Q correlation sums to measure phase. This represents a complex sum of the direct plus multipath signals. With this configuration, multipath will have the most affect on the prompt signal and the least on the earliest. This results in a phase offset (or error signal) between adjacent correlation sums. The technique described here, simply measures the slope of the error signals on the two early lags and forms an error signal for the prompt lag by extrapolation. Simulation results for this technique are shown in FIG. 12.

Figure 13:
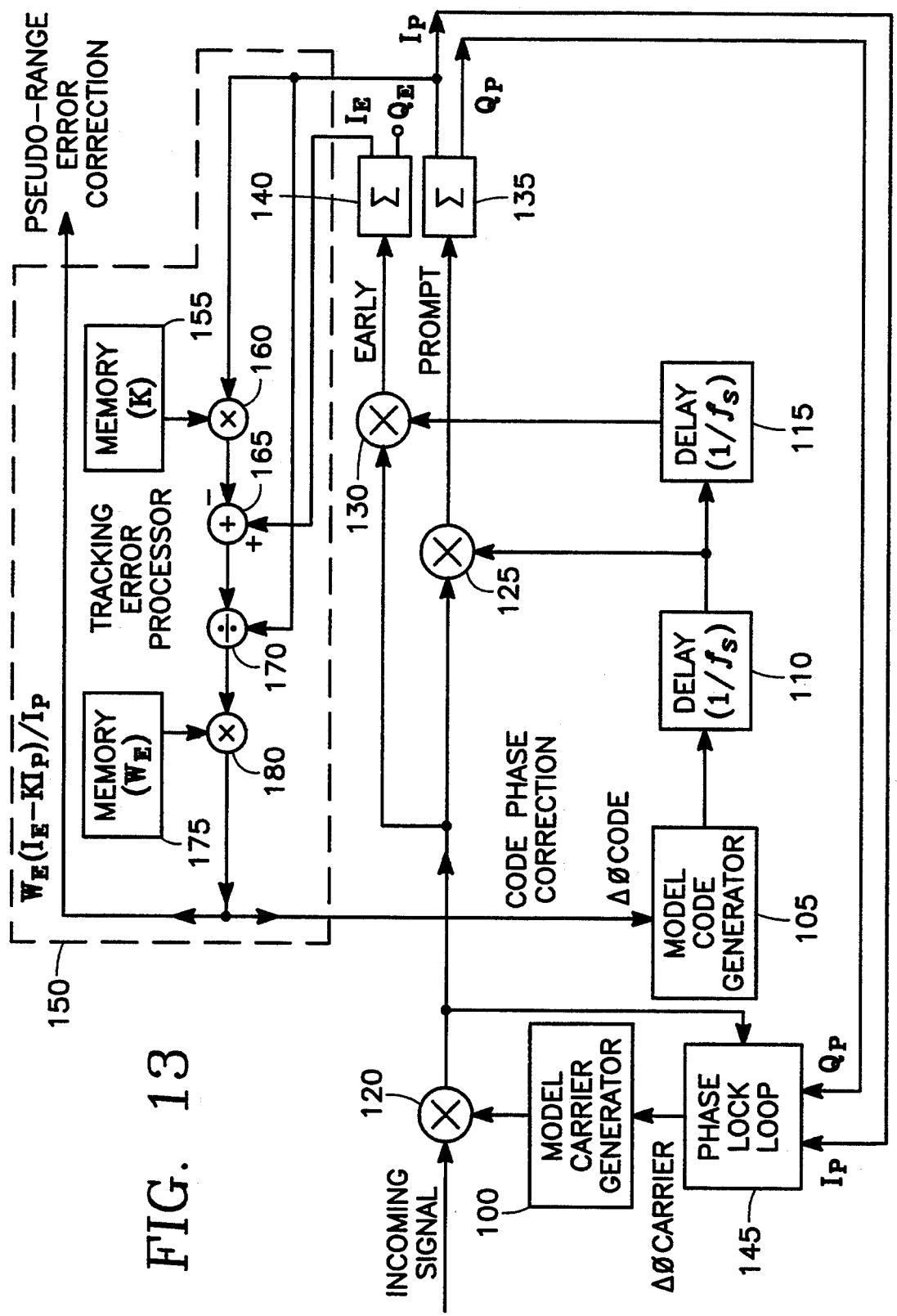
FIG. 13 is a block diagram of an implementation of the early-prompt tracking of the first embodiment of the invention.

Implementation of Early-Prompt Tracking:

FIG. 13 illustrates a preferred implementation of the early-prompt tracking embodiment of the present invention discussed earlier. An incoming signal consists of a digital code modulating a carrier frequency. The earlier prompt tracking apparatus of FIG. 13 includes a model carrier generator 100 producing a local model of the carrier of the incoming signal and a model code generator 105 producing a local model of the spread spectrum code carrier by the incoming signal. A pair of delays 110, 115 produce successively delayed versions of the model code.

A first multiplier 120 multiplies the incoming signal by the model carrier signal, to produce what may be thought of as a demodulated signal. A prompt multiplier 125 multiplies the demodulated signal from the first multiplier 120 by the version of the model code which has been delayed by the first delay 110 by 50 nanoseconds. An early multiplier 130 multiplies the demodulated signal from the first multiplier 120 by the version of the model code signal which has been delayed an additional 50 nanoseconds by the second delay 115. The prompt and early multipliers 125, 130 produce, respectively, prompt and early cross-correlation products. The prompt cross-correlation products are summed by a prompt correlator 135 to produce a prompt cross-correlation function. The early cross-correlation products are summed by an early correlator 140 to produce an early cross-correlation function. The early and prompt cross-correlation functions satisfy the conventional definition and are therefore complex quantities consisting of in-phase (I) and quadrature (Q) components (or, alternatively, real and imaginary parts). Therefore, each correlator 135, 140 has I and Q outputs providing, respectively, in-phase and quadrature correlation sums.

The I and Q outputs of the prompt correlator 135 control a phase-lock loop (PLL) 145 governing the phase of the model carrier signal from the model carrier source 100 using the output of the multiplier 120 as feedback, in accordance with well-known techniques in the art.

A tracking processor 150 computes a multipath delay tracking error from the I outputs of both the early and prompt correlators 135, 140. In the embodiment illustrated in FIG. 13, the tracking processor 150 has a memory 155 storing a constant k. A multiplier 160 multiplies the I output of the prompt correlator 135, i.e., $I_P$, by k to produce $kI_P$ and an adder 165 subtracts the resulting product from $I_E$, the I output of the early correlator 140, the resulting difference, $I_E - kI_P$, being divided at a divider 170 by the I output of the prompt correlator 135. The final result, $W_E(I_E - kI_P)/I_P$ is obtained by a multiplier 180 multiplying the output of the divider 170 by an "early" weight factor $W_E$. The final result is the delay tracking error. As indicated in the drawing of FIG. 13, this delay tracking error is applied as a phase correction signal to the model code generator 105. If the apparatus is used in the GPS system as a receiver, then the delay tracking error is also transmitted to further processing devices (not shown) for use as an error correction term to the latest calculated value of the pseudo range.

The system of FIG. 13 operates preferably at 20 MHz in cycles of 50 nanoseconds in length. During each cycle or time frame, the correlation products are accumulated by the correlators 135, 140 and at the end of the cycle each correlator outputs the magnitude of the in-phase and quadrature (I and Q) components of the correlation function. The tracking error processor 150 then computes from the early and prompt in-phase components the correction to the model code phase and applies this correction to the model code generator 105. This corrects the model code phase for multipath delay changes in the incoming signal since the previous cycle. After this, the entire foregoing process is repeated.

The in-phase outputs of the correlators 135, 140 are employed by the tracking error processor 150 (as opposed to the quadrature outputs) because it is the quadrature components which are most affected (delayed) by multipath effects while the in-phase components are the least affected.

In the absence of multipath distortion or noise, there is a certain measurable ratio between the magnitudes of $I_E$ and $I_P$, the in-phase components of the early and prompt correlation functions. We may refer to this ratio as a fiducial ratio. The selection of k as 0.5 assumes that ratio to be 0.5, which assumption can be tested by measuring $I_E$ and $I_P$ under ideal multipath-free conditions. The multipath distortion can be directly inferred by measuring the actual ratio between $I_E$ and $I_P$ and comparing it with the fiducial ratio. In fact, this comparison is precisely what the delay tracking error produced by the tracking error processor reflects. As long as $I_E = -kI_P$, the correction applied to the model code phase is zero. Thus, delay tracking error is computed using only those correlation sums ($I_E$ and $I_P$) which are most reliable in the presence of multipath, as discussed earlier herein.

Figure 14:
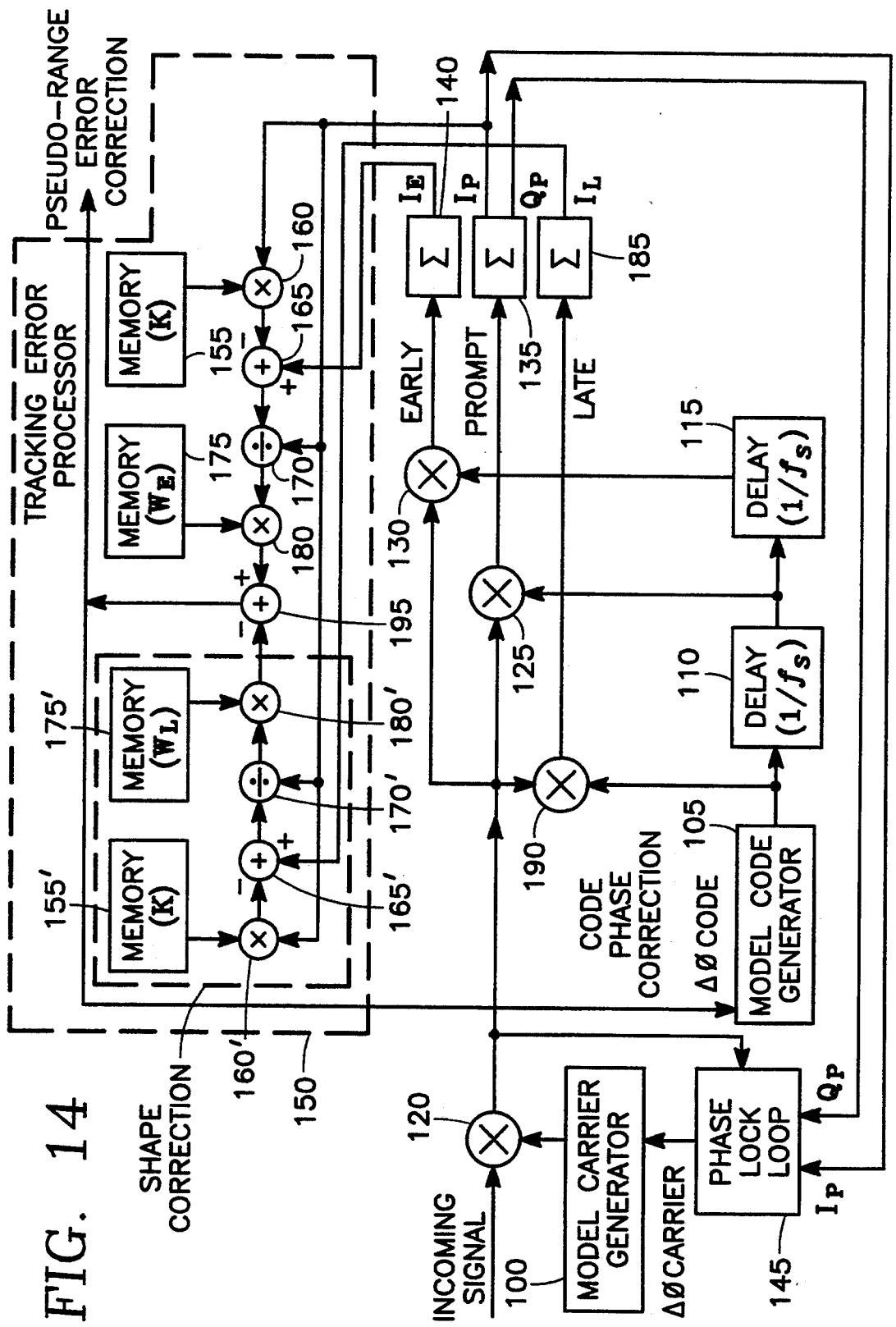
FIG. 14 is a block diagram of an implementation of the multipath correction of correlation shape of the second embodiment of the invention.

Preferred Implementation of Multipath Correction of Correlation Shape:

FIG. 14 illustrates an enhancement to the system of FIG. 13 in which a shape correction feature is added to the tracking error processor 150, based upon a de-weighted contribution of the cross-correlation function obtained from a "late" correlator 185. For this purpose, a late multiplier 190 multiplies an undelayed version of the model code by the demodulated incoming signal to produce late cross-correlation products, which the late correlator 185 sums to produce a late cross-correlation function. The in-phase component $I_L$ of the late cross-correlation function (the I output of the late correlator 185) is processed by the tracking error processor 150 in the same manner as the tracking error processor 150 processes the $I_E$ component as described in FIG. 13, with a key difference that the final result is de-weighted. Specifically, the correlation shape correction feature added to the tracking error processor includes a memory 155' storing the constant k. A multiplier 160' multiplies the I output of the prompt correlator 135, i.e., $I_P$, by k to produce $kI_P$ and an adder 165' subtracts the resulting product from $I_L$, the I output of the late correlator 140. The resulting difference, $I_L - kI_P$, is divided at a divider 170' by $I_P$, the I output of the prompt correlator 135. The final result, $W_L(I_L - kI_P)/I_P$ is obtained by a multiplier 180' multiplying the output of the divider 170' by a "late" weight factor $W_L$ smaller than the "early" weight factor $W_E$. The result is the multipath correlation shape correction, and is subtracted at a summing node 195 from the delay tracking error whose computation was described herein with reference to FIG. 13.

In the preferred embodiment, $W_E = 1$, $W_L = 0.3$ and $k = 0.585$. This reflects the fact that in the absence of multipath distortion, both $I_E$ and $I_L$ are equal to 0.585 $I_P$, which can be confirmed by measuring these quantities under ideal multipath-free conditions. Thus, the correction to the model code phase computed by the delay tracking processor 150 in the embodiment of FIG. 14 is zero as long as both $I_E$ and $I_L$ are each equal to 0.585 $I_P$. The correction is a linear function of the deviation from this ratio. However, since the measurement of $I_L$ is not as reliable under multipath conditions, the correction obtained therefrom is treated as a minor correction for correlation shape distortion due to multipath and significantly discounted (to less than a factor of one-third) relative to the correction obtained from $I_P$.

Figure 15:
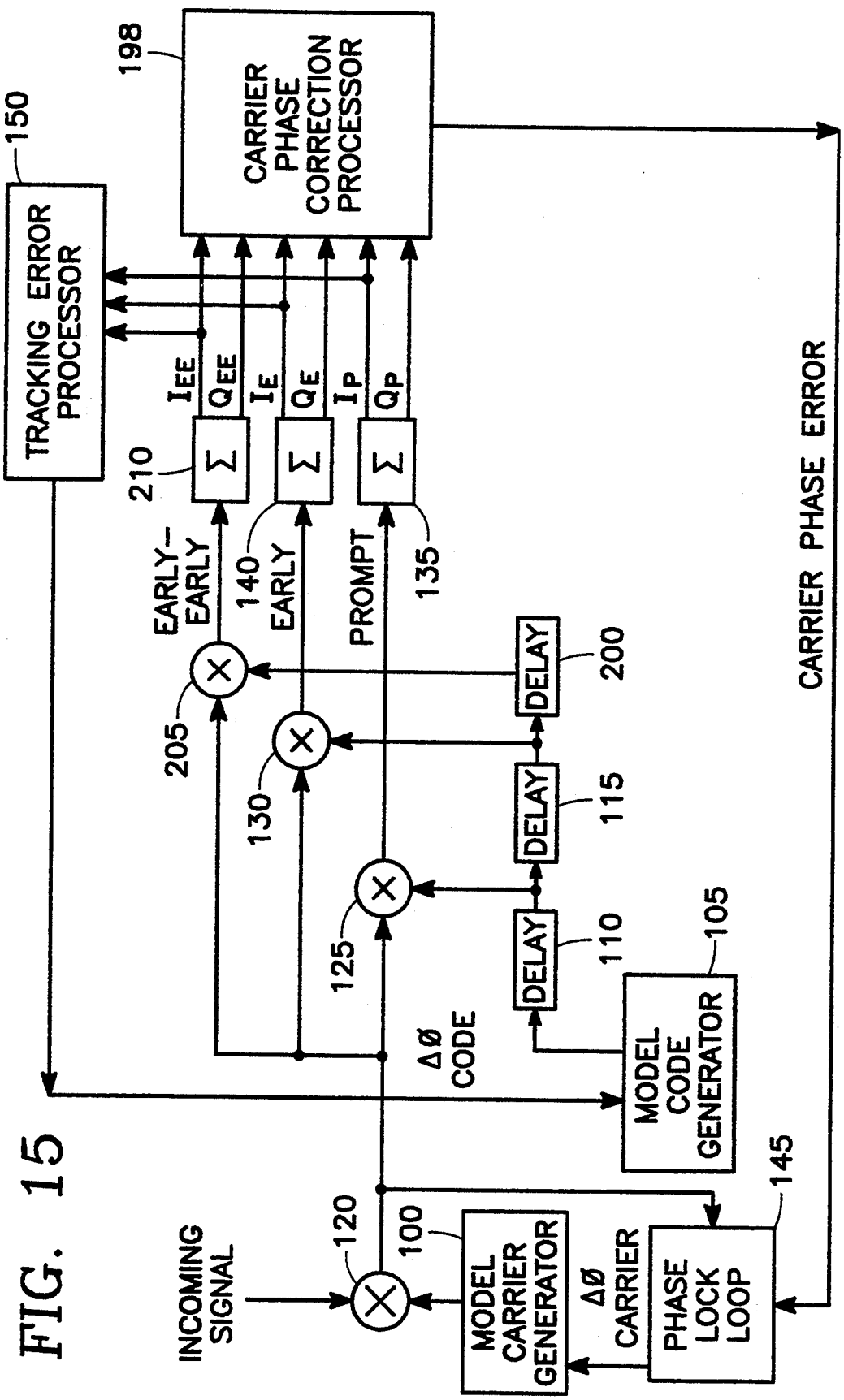
FIG. 15 is a block diagram of an implementation of the carrier phase multipath correction in accordance with the third embodiment of the invention.

Preferred Implementation of Carrier Phase Multipath Correction:

FIG. 15 illustrates the preferred implementation of carrier phase multipath correction in accordance with the invention. The embodiments of FIGS. 13 and 14 described above concern a tracking error processor 150 controlling the phase of the model code generator 105. In contrast, the embodiment of FIG. 15 concerns a carrier phase correction processor 198 controlling the phase of the model carrier generator 100 through the phase lock loop 145. The embodiment of FIG. 15 has a structure analogous to that of the apparatus of FIG. 14, with the following exceptions: The carrier phase correction processor 198 is added. An additional or third delay 200 provides a third version of the model code delayed by 150 nanoseconds. A multiplier 205 multiplies this third delayed version by the demodulated incoming signal to produce an "early-early" cross-correlation sum, which is accumulated in an "early-early" correlator 210 to provide an "early-early" cross-correlation function, whose in-phase and quadrature components are labelled $I_{EE}$ and $Q_{EE}$, respectively.

The carrier phase correction processor 198 uses the in-phase and quadrature components $I_P$, $Q_P$, $I_E$, $Q_E$, and $I_{EE}$, $Q_{EE}$ provided by the three correlators 135, 140 and 210 respectively, to compute a phase error to control the phase of the model carrier generator 100. Advantageously, no "late" cross-correlation terms need be employed in this embodiment.

Figure 16:
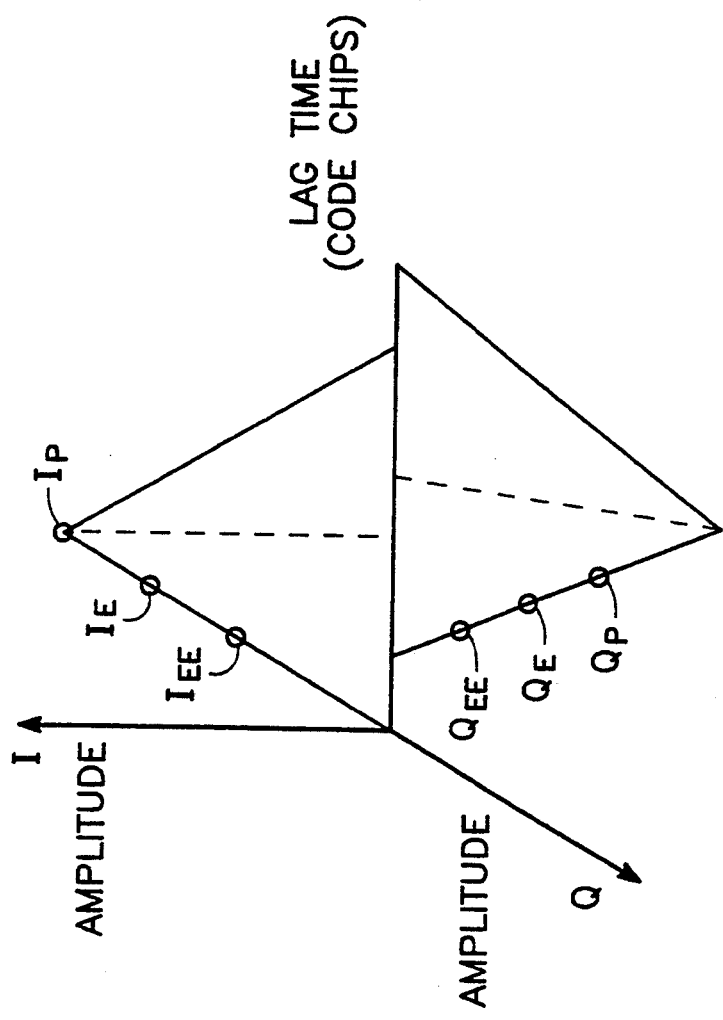
FIG. 16 is a graph illustrating the in-phase and quadrature outputs of the correlators of FIG. 15 as a function of lag time of each correlator.

FIG. 16 illustrates the amplitudes of the I and Q outputs of the three correlators 135, 140 and 210 during a given sampling interval, with the amplitudes being placed along the "lag time" or delay axis in accordance with the lag of the corresponding correlator. FIG. 16 shows that in the presence of multipath distortion, the quadrature components are all off-set along the lag time or delay axis with respect to the in-phase components by a certain amount corresponding to the multipath delay.

Figure 17:
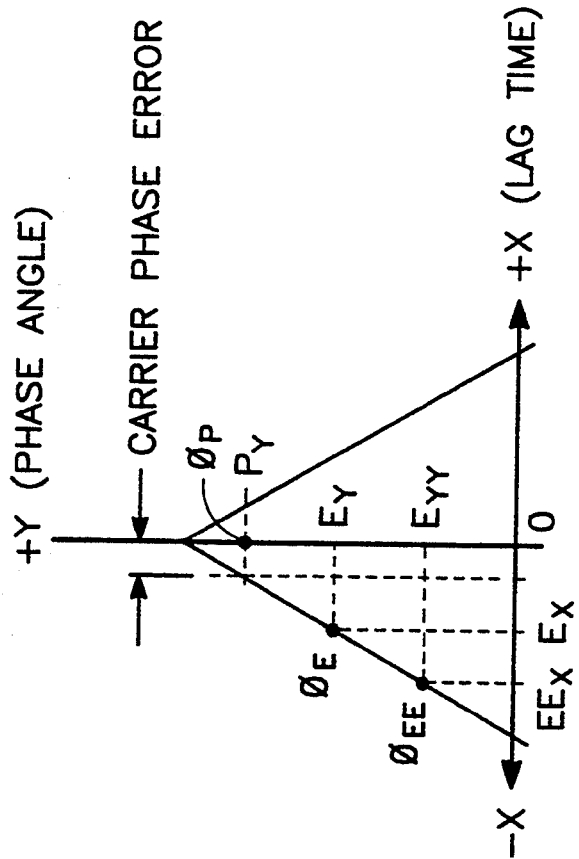
FIG. 17 is a diagram illustrating a concept underlying the tracking error processing in the third embodiment of the invention.

The function performed by the carrier phase correction processor 198 in the embodiment of FIG. 15 is illustrated in FIG. 17. In the graph of FIG. 17, the horizontal axis denotes lag time or delay relative to the reference frame of the prompt correlator 135 controlling the model carrier phase. The term $\phi$ denotes the phase computed from the I and Q components provided by a given one of the three correlators, where $\phi$=arctan [I/Q]. In FIG. 17, by plotting the phases $\phi_{EE}$, $\phi_E$, $\phi_P$ of the three cross-correlations from the three correlators 135, 140 and 210 respectively, at the respective lag time locations on the graph, a curve $\phi(t)$ may be interpolated. In the graph of FIG. 17, the horizontal axis is lag time or delay in code chips while the vertical axis is the value of the phase angle $\phi$. Thus, in FIG. 17 $\phi_E$ is displaced to the left of $\phi_P$ by one delay lag (50 nanoseconds) while $\phi_{EE}$ is displaced to the left by two delay lags. The prompt phase $\phi_P$ is on the vertical (Y) axis, denoting zero delay for the phase of the prompt cross-correlation under ideal multipath-free conditions. The intercepts of each of the three phases $\phi_{EE}$, $\phi_E$, $\phi_P$ with the horizontal or X axis are denoted by X subscripts while their vertical intercepts with the Y axis are denoted by Y subscripts in FIG. 17.

Under ideal conditions in the absence of multipath distortion, the tracking error is zero, and the curve $\phi(t)$ through $\phi_{EE}$ and $\phi_E$ is a horizontal line intercepting $\phi_P$. In the presence of multipath distortion, the curve $\phi(t)$ is a slope as shown in FIG. 17 and misses $\phi_P$. The tracking error is the distance between the projection along the horizontal X (time) axis of the intersection of this line with the amplitude of $Q_P$ and the origin. To a first order approximation, $\phi(t)$ is a straight line passing through $\phi_{EE}$ and $\phi_E$, so that the error may be approximated with simple algebra from the values of the X and Y intercepts of $\phi_{EE}$, $\phi_E$ and $\phi_P$ as follows:

$$error = (P_y - E_y)[(E_X - EE_X)/(E_Y - EE_Y)] - E_X$$

However, such a simple calculation does not take into account the non-linearities inherent in the behavior of the phase $\phi(t)$. In fact, in a more robust implementation of the carrier phase correction embodiment, rather than only two early delay lags (E and EE) and only two early correlators 140, 210, n early delay lags are defined, which may be equally spaced along the X axis of FIG. 17, requiring n early correlators and the corresponding multipliers, where n is an integer significantly greater than 2. A conventional curve-fitting routine in the carrier phase correction processor 198 constructs a curve $\phi(t)$ from all of the phases $\phi$ of the early cross-correlations and extrapolates this curve to the Y-axis. As stated above with reference to FIG. 17, the error is the distance along the X axis between the intercept of $P_Y$ with the curve $\phi(t)$ and the origin. Simple calculus techniques are employed by the carrier phase correction processor 198 to compute this distance from the curve $\phi(t)$ provided by the curve-fitting routine and from $P_Y$. Such routines typically must know an a priori nominal curve to which a fit is to be made. For this purpose, a preliminary plot $\phi(t)_{ideal}$ of the n early cross-correlation phases $\phi$ is first be obtained under ideal conditions in which no multipath distortion is present, and $\phi(t)_{ideal}$ is stored for use by the curve fitting routine during real-time operation.

Other implementations of the invention may be readily constructed in view of the foregoing. For example, the order of the multiplication step may be reversed. Specifically, in FIG. 13 the multiplication by the prompt and early model code (by the multipliers 125, 130) may be performed before the multiplication by the model carrier (by the multiplier 120). The same is true in FIG. 14, in which the multiplication (120) by the model carrier may occur after the multiplication (125, 130, 190) by the prompt, early and late versions of the model code. Likewise, in FIG. 15, the multiplication (125, 130, 205) by the prompt, early and early-early versions of the model code may precede multiplication (120) by the model carrier.

Moreover, in the embodiment of FIG. 15 in which the model carrier generator 100 is controlled through the phase lock loop 145 by the carrier phase correction processor 198, the tracking error processor 150 controlling the model code generator 105 may be either that of FIG. 13 or that of FIG. 14 or else conventional techniques may be used to control the model code generator phase. Preferably, however, in the embodiment of FIG. 15 the tracking error processor 150 is that of FIG. 14.

While the invention has been described in detail by specific reference to preferred embodiments, it is understood that variations and modifications thereof may be made without departing from the true spirit and scope of the invention.

What is claimed is:

1. In a receiver for receiving an incoming signal consisting of a carrier tone modulated by a spread spectrum code sequence, the receiver being of the type which generates a local model of the carrier tone and a local model of the code sequence, apparatus for measuring multipath distortion, comprising:

means for generating plural versions of said model code sequence delayed by respective multiples of a predetermined delay time;

means for generating plural product signals by a multiplication of said incoming signal by one of (a) said model carrier tone and (b) a respective one of said plural model code versions, and then multiplying the result of said multiplication by the other of (a) and (b);

correlator means for computing respective cross-correlation functions from respective ones of said plural product signals; and measuring means for computing an error corresponding to a deviation from a predetermined relationship among said respective cross-correlation functions, and for outputting said error as a measurement of multipath distortion in said incoming signal.

2. The apparatus of claim 1 further comprising means for reducing said deviation comprising means for changing the phase of said model code sequence in accordance with said error.

3. The apparatus of claim 1 further comprising means for reducing said deviation comprising means for changing the phase of said model carrier in accordance with said error.

4. The apparatus of claim 1 wherein:
said plural versions of a model code sequence correspond to two different multiples of a predetermined delay time, whereby said respective cross-correlation functions comprise an early cross-correlation function and a prompt cross-correlation function.

5. The apparatus of claim 4 further comprising a phase lock loop controlling the phase of said model carrier tone relative to the carrier of said incoming signal in response to said prompt cross-correlation function.

6. The apparatus of claim 4 wherein said correlator means computes said cross-correlation functions by accumulating respective product signals over a sampling interval of length T and computes successive cross-correlation functions in successive cycles of period T.

7. The apparatus of claim 6 wherein said predetermined delay time is said period T and said multiples of said delay time are one and two for said prompt and early model code sequence versions respectively.

8. The apparatus of claim 4 wherein:
said cross-correlation functions are complex and comprise in-phase and quadrature components;
said predetermined relationship is a predetermined ratio between a selected one of the in-phase and quadrature components of the prompt and early cross-correlation functions.

9. The apparatus of claim 4 wherein said predetermined ratio is the ratio between the in-phase components of said prompt and early cross-correlation functions prevailing in the absence of multi-path distortion.

10. The apparatus of claim 9 wherein said measuring means comprises means for measuring an actual ratio between said in-phase components of said prompt and early cross-correlation functions and wherein said error is a function of the deviation of said actual ratio from said predetermined ratio.

11. The apparatus of claim 1 wherein said incoming signal is from a global positioning satellite and wherein said error comprises a correction to a previously estimated pseudo-range value.

12. The apparatus of claim 1 wherein:
said plural versions of a model code sequence correspond to three different multiples of a predetermined delay time, whereby said respective cross-correlation functions comprise an early cross-correlation function, a prompt cross-correlation function and a late cross-correlation function; and
said predetermined relationship comprises a first predetermined ratio between corresponding values of a selected component of said early and prompt cross-correlation functions and a second predetermined ratio between corresponding values of the selected component of said late and prompt cross-correlation functions.

13. The apparatus of claim 12 wherein:
said cross-correlation functions are complex and comprise in-phase and quadrature components;
said first and second predetermined relationships are, respectively, a predetermined ratio between a selected one of the in-phase and quadrature components of the prompt and early cross-correlation functions and a predetermined ratio between said selected one component of the prompt and late cross-correlation functions.

14. The apparatus of claim 13 further comprising means for controlling the phase of said model carrier in accordance with the in-phase and quadrature components of said prompt cross-correlation.

15. The apparatus of claim 13 further comprising correction means for reducing said error comprising means for correcting the phase of said model code sequence in accordance with said error.

16. The apparatus of claim 15 wherein said first and second predetermined ratios are ratios between the in-phase components of said early and prompt cross-correlations and between said late and prompt cross-correlations observable in the absence of multi-path distortion in said incoming signal.

17. The apparatus of claim 16 wherein said error measuring means comprises means for measuring an actual ratio between said in-phase components of said prompt and early cross-correlation functions and producing a first error signal which is a function of the deviation of said actual ratio from said first predetermined ratio.

18. The apparatus of claim 17 wherein said correction means further comprises means for measuring an ratio between said in-phase components of said prompt and late cross-correlation functions and producing a second error signal which is a function of the deviation of said actual ratio from said second predetermined ratio weighted with respect to said first error signal such that the weight of the second error signal is less than a weight given the first error signal and for combining said first and second error signals.

19. The apparatus of claim 1 wherein:
said plural versions of a model code sequence correspond to plural different multiples of a predetermined delay time, whereby said respective cross-correlation functions comprise plural early cross-correlation functions and a prompt cross-correlation function.

20. The apparatus of claim 19 wherein said predictable behavior is defined relative to a curve obtained by associating phase angles of said plural early cross-correlation functions with delay times of the respective early cross-correlation functions, said predictable behavior comprising said curve intersecting the phase angle of said prompt cross-correlation function at the delay time of said prompt cross-correlation function.

21. The apparatus of claim 20 wherein said error measuring means comprises curve fitting means for computing a delay time at which said curve meets the value of the phase of said prompt cross-correlation function, and establishing therefrom said error.

22. The apparatus of claim 21 wherein:
said cross-correlation functions are complex and comprise in-phase and quadrature components;
the phase angle of each cross-correlation function is the arc-tangent of the ratio of in-phase and quadrature components thereof.

23. The apparatus of claim 22 further comprising means for reducing said error comprising means for correcting the phase of said model carrier in accordance with said error.

24. The apparatus of claim 19 wherein:
there are n plural early correlation functions, and n is an integer greater than 2.

25. The apparatus of claim 19 further comprising:
delay error tracking means for computing a delay tracking error corresponding to a deviation from a second predetermined relationship between said prompt and one of said early cross-correlation functions, and for reducing said deviation by changing the phase of said model code sequence in accordance with said delay tracking error.

26. The apparatus of claim 25 wherein:
said cross-correlation functions are complex and comprise in-phase and quadrature components;
said second predetermined relationship is a predetermined ratio between a selected one of the in-phase and quadrature components of the prompt and one early cross-correlation functions.

27. The apparatus of claim 26 wherein said predetermined ratio is the ratio between the in-phase components of said prompt and one early cross-correlation functions prevailing in the absence of multi-path distortion.

28. The apparatus of claim 27 wherein said delay error tracking means comprises means for measuring an actual ratio between said in-phase components of said prompt and said one early cross-correlation function and producing a tracking delay error signal which is a function of the deviation of said actual ratio from said predetermined ratio.

29. The apparatus of claim 25 wherein said respective cross-correlation functions further include a late cross-correlation function corresponding to a delay time greater than that of said prompt cross-correlation, said apparatus further comprising:
correction means for computing a correction to said delay tracking error corresponding to a deviation from a third predetermined relationship between said late and prompt cross-correlation functions, said correction being weighted relative to said delay tracking error such that the weight of the correction corresponding to the deviation from the third predetermined relationship between said late and prompt cross-correlation functions is less than a weight given the delay tracking error corresponding to the deviation from the second predetermined relationship between said prompt and one of said early cross-correlation functions, and for correcting said delay tracking error by combining it with said correction.

30. The apparatus of claim 29 wherein:
said cross-correlation functions are complex and comprise in-phase and quadrature components;
said second predetermined relationship is a first predetermined ratio between a selected one of the in-phase and quadrature components of the prompt and one early cross-correlation functions.

31. The apparatus of claim 30 wherein:
said third predetermined relationship is a second predetermined ratio between said selected one component of the prompt and late cross-correlation functions.

32. The apparatus of claim 31 wherein said first and second predetermined ratios correspond to, respectively, a ratio between the in-phase components of said prompt and one early cross-correlation functions and a ratio between the in-phase components of said late and prompt cross-correlation functions, in the absence of multi-path distortion in said incoming signal.

33. The apparatus of claim 32 wherein said delay error tracking means comprises means for measuring an actual ratio between said in-phase components of said prompt and late cross-correlation functions.

34. A method of measuring multipath distortion in a receiver responsive to an incoming signal consisting of a carrier tone modulated by a spread spectrum code sequence, the receiver being of the type which generates a local model of the carrier tone and a local model of the code sequence, said method comprising:
generating plural versions of said model code sequence delayed by respective multiples of a predetermined delay time;
generating plural product signals by a multiplication of said incoming signal by one of (a) said model carrier tone and (b) a respective one of said plural model code versions, and then multiplying the result of said multiplication by the other of (a) and (b);
computing respective cross-correlation functions from respective ones of said plural product signals; and
measuring an error corresponding to a deviation from a predetermined relationship among said respective cross-correlation functions, and outputting said error as a measurement of multipath distortion in said incoming signal.

35. The method of claim 34 further comprising receiving said error and reducing said deviation by changing the phase of said model code sequence in accordance with said error.

36. The method of claim 34 further comprising reducing said deviation by changing the phase of said model carrier in accordance with said error.

37. The method of claim 34 wherein:
said plural versions of a model code sequence correspond to two different multiples of a predetermined delay time, whereby said respective cross-correlation functions comprise an early cross-correlation function and a prompt cross-correlation function.

38. The method of claim 37 further comprising a controlling the phase of said model carrier tone relative to the carrier of said incoming signal in response to said prompt cross-correlation function.

39. The method of claim 37 wherein said cross-correlation functions are computed by accumulating respective product signals over a sampling interval of length T and computing successive cross-correlation functions in successive cycles of period T.

40. The method of claim 39 wherein said predetermined delay time is said period T and said multiples of said delay time are one and two for said prompt and early model code sequence versions respectively.

41. The method of claim 37 wherein:
said cross-correlation functions are complex and comprise in-phase and quadrature components;
said predetermined relationship is a predetermined ratio between a selected one of the in-phase and quadrature components of the prompt and early cross-correlation functions.

42. The method of claim 37 wherein said predetermined ratio is the ratio between the in-phase components of said prompt and early cross-correlation functions prevailing in the absence of multi-path distortion.

43. The method of claim 42 wherein said measuring comprises measuring an actual ratio between said in-phase components of said prompt and early cross-correlation functions and wherein said error is a function of the deviation of said actual ratio from said predetermined ratio.

44. The method of claim 34 wherein said incoming signal is from a global positioning satellite and wherein said error comprises a correction to an estimated pseudo-range value computed during a previous cycle.

45. The method of claim 34 wherein:
said plural versions of a model code sequence include three different multiples of a predetermined delay time, whereby said respective cross-correlation functions include an early cross-correlation function, a prompt cross-correlation function and a late cross-correlation function; and
said predetermined relationship comprises a first predetermined ratio between corresponding values of a selected component of said early and prompt cross-correlation functions and a second predetermined ratio between corresponding values of the selected component of said late and prompt cross-correlation functions.

46. The method of claim 45 wherein:
said cross-correlation functions are complex and comprise in-phase and quadrature components;
said first and second predetermined relationships are, respectively, a predetermined ratio between a selected one of the in-phase and quadrature components of the prompt and early cross-correlation functions and a predetermined ratio between said selected one component of the prompt and late cross-correlation functions.

47. The method of claim 46 further comprising controlling the phase of said model carrier in accordance with the in-phase and quadrature components of said prompt cross-correlation.

48. The method of claim 46 further comprising reducing said error by correcting the phase of said model code sequence in accordance with said error.

49. The method of claim 48 wherein said first and second predetermined ratios are ratios between the in-phase components of said early and prompt cross-correlations and between said late and prompt cross-correlations observable in the absence of multi-path distortion in said incoming signal.

50. The method of claim 49 wherein said measuring comprises measuring an actual ratio between said in-phase components of said prompt and early cross-correlation functions and producing a first error signal which is a function of the deviation of said actual ratio from said first predetermined ratio.

51. The method of claim 50 wherein said correcting comprises measuring an ratio between said in-phase components of said prompt and late cross-correlation functions and producing a second error signal which is a function of the deviation of said ratio from said second predetermined ratio weighted with respect to said first error signal such that the weight of the second error signal is less than a weight given the first error signal and combining said first and second error signals.

52. The method of claim 34 wherein:
said plural versions of a model code sequence correspond to different plural multiples of a predetermined delay time, whereby said respective cross-correlation functions comprise plural early cross-correlation functions and a prompt cross-correlation function.

53. The method of claim 52 wherein said predictable behavior is defined relative to a curve obtained by associating phase angles of said plural early cross-correlation functions with delay times of the respective early cross-correlation functions, said predictable behavior comprising said curve intersecting the phase angle of said prompt cross-correlation function at the delay time of said prompt cross-correlation function.

54. The method of claim 53 wherein said measuring comprises computing a delay time at which said curve meets the value of the phase of said prompt cross-correlation function, and establishing therefrom said error.

55. The method of claim 54 wherein:
said cross-correlation functions are complex and comprise in-phase and quadrature components;
the phase angle of each cross-correlation function is the arc-tangent of the ratio of in-phase and quadrature components thereof.

56. The method of claim 55 further comprising reducing said error by correcting the phase of said model carrier in accordance with said error.

57. The method of claim 52 wherein:
there are n plural early correlation functions, and n is an integer greater than 2.

58. The method of claim 52 further comprising:
computing a delay tracking error corresponding to a deviation from a second predetermined relationship between said prompt and one of said early cross-correlation functions, and reducing said deviation by changing the phase of said model code sequence in accordance with said delay tracking error.

59. The method of claim 58 wherein:
said cross-correlation functions are complex and comprise in-phase and quadrature components;
said second predetermined relationship is a predetermined ratio between a selected one of the in-phase and quadrature components of the prompt and one early cross-correlation functions.

60. The method of claim 59 wherein said predetermined ratio is the ratio between the in-phase components of said prompt and one early cross-correlation functions prevailing in the absence of multi-path distortion.

61. The method of claim 60 wherein said computing a delay error tracking comprises measuring an actual ratio between said in-phase components of said prompt and one early cross-correlation functions and producing a tracking delay error signal which is a function of the deviation of said actual ratio from said predetermined ratio.

62. The method of claim 61 wherein said respective cross-correlation functions further include a late cross-correlation function corresponding to a delay time greater than that of said prompt cross-correlation, said method further comprising:
computing a correction to said delay tracking error in accordance with a deviation from a third predetermined relationship between said late and prompt cross-correlation functions, said correction being weighted relative to said delay tracking error such that of the correction corresponding to the deviation from the third predetermined relationship between said late and prompt cross-correlation functions is less than a weight given the delay tracking error corresponding to the deviation from the second predetermined relationship between said prompt and one of said early cross-correlation functions, and correcting said delay tracking error by combining it with said correction.

63. The method of claim 62 wherein:
said cross-correlation functions are complex and comprise in-phase and quadrature components;
said second predetermined relationship is a first predetermined ratio between a selected one of the in-phase and quadrature components of the prompt and one early cross-correlation functions.

64. The method of claim 63 wherein:
said third predetermined relationship is a second predetermined ratio between said selected one component of the prompt and late cross-correlation functions.

65. The method of claim 64 wherein said first and second predetermined ratios correspond to, respectively, a ratio between the in-phase components of said prompt and one early cross-correlation functions and a ratio between the in-phase components of said late and prompt cross-correlation functions, in the absence of multi-path distortion in said incoming signal.

66. The method of claim 65 wherein said computing the delay tracking error comprises measuring an actual ratio between said in-phase components of said prompt and late cross-correlation functions.

* * * * *